US008229686B2

(12) United States Patent
Rawat (10) Patent No.: US 8,229,686 B2
(45) Date of Patent: Jul. 24, 2012

(54) APPARATUS AND METHOD FOR MEASURING LIQUID AND GAS FLOW RATES IN A STRATIFIED MULTI-PHASE FLOW

(75) Inventor: Abhinav Singh Rawat, New Haven, CT (US)

(73) Assignee: Expro Meters, Inc., Wallingford, CT (US)

( * ) Notice: Subject to any disclaimer, the term of this patent is extended or adjusted under 35 U.S.C. 154(b) by 537 days.

(21) Appl. No.: 12/164,828

(22) Filed: Jun. 30, 2008

(65) Prior Publication Data
US 2009/0006008 A1 Jan. 1, 2009

Related U.S. Application Data

(60) Provisional application No. 60/946,735, filed on Jun. 28, 2007.

(51) Int. Cl.
*G01F 1/66* (2006.01)
(52) U.S. Cl. ........... 702/48; 702/45; 73/861; 73/861.27; 73/861.31
(58) Field of Classification Search ............ 702/45, 702/47
See application file for complete search history.

(56) References Cited

U.S. PATENT DOCUMENTS

| | | | |
|---|---|---|---|
| 3,940,985 A | 3/1976 | Wyler | |
| 5,929,342 A | 7/1999 | Thompson et al. | |
| 6,386,018 B1 | 5/2002 | Letton et al. | |
| 6,481,288 B1 | 11/2002 | Humphrey et al. | |
| 6,550,345 B1 * | 4/2003 | Letton | 73/861.27 |
| 6,575,043 B1 * | 6/2003 | Huang et al. | 73/861.25 |
| 6,609,069 B2 | 8/2003 | Gysling | |
| 6,634,239 B2 | 10/2003 | Gomm et al. | |
| 6,945,095 B2 * | 9/2005 | Johansen | 73/61.45 |
| 7,096,719 B2 | 8/2006 | Gysling | |
| 7,134,320 B2 | 11/2006 | Gysling et al. | |
| 7,261,002 B1 | 8/2007 | Gysling et al. | |
| 7,322,245 B2 | 1/2008 | Gysling et al. | |
| 7,331,233 B2 | 2/2008 | Scott | |
| 7,379,828 B2 | 5/2008 | Loose et al. | |

(Continued)

FOREIGN PATENT DOCUMENTS
DE 4306119 9/1994
(Continued)

OTHER PUBLICATIONS

Piezo Film Sensors Technical Manual, Measurement Specialties, Inc.
(Continued)

*Primary Examiner* — Jonathan C Teixeira Moffat
(74) *Attorney, Agent, or Firm* — O'Shea Getz P.C.

(57) ABSTRACT

A method and apparatus for measuring a flow rate of a component of a stratified two-phase fluid flow within a substantially horizontally extending pipe is provided. The method includes the steps of: a) determining a first fluid velocity value and a second fluid velocity value within the pipe section; b) determining a density of the fluid flow within the pipe section, and creating a measured fluid density value; c) determining a degree of fluid phase stratification of the fluid flow using at least one of the top and bottom fluid flow velocity values, and the measured fluid density value; and d) determining a flow rate value for at least one of a liquid component of the fluid flow and a gas component of the fluid flow within the pipe section.

15 Claims, 9 Drawing Sheets

U.S. PATENT DOCUMENTS

| | | | |
|---|---|---|---|
| 7,380,438 B2 | 6/2008 | Gysling et al. | |
| 7,389,687 B2 | 6/2008 | Gysling et al. | |
| 7,437,946 B2 | 10/2008 | Gysling | |
| 7,440,873 B2 | 10/2008 | Bailey | |
| 7,454,981 B2 * | 11/2008 | Gysling | 73/861.31 |
| 7,516,024 B2 | 4/2009 | Gysling | |
| 7,526,966 B2 | 5/2009 | Gysling et al. | |
| 7,836,973 B2 * | 11/2010 | Belcher et al. | 175/25 |
| 2002/0069022 A1 * | 6/2002 | Fincke | 702/45 |
| 2005/0125169 A1 * | 6/2005 | Loose | 702/45 |
| 2005/0246111 A1 * | 11/2005 | Gysling et al. | 702/45 |
| 2007/0005272 A1 | 1/2007 | Gysling | |
| 2007/0124091 A1 * | 5/2007 | Wee | 702/49 |
| 2008/0276723 A1 | 11/2008 | Gysling | |

FOREIGN PATENT DOCUMENTS

| | | |
|---|---|---|
| GB | 2210169 | 6/1989 |
| WO | 9314382 | 7/1993 |

OTHER PUBLICATIONS

Lee et al. "Development of an Array of Pressure Sensors with PVDF Film", Experiments in Fluids, 1999, pp. 27-35.

Gysling et al. "Sonar-Based Volumetric Flow Meter for Pulp and Paper Applications", CiDRA Corporation, Dec. 13, 2002.

* cited by examiner

APPARATUS AND METHOD FOR MEASURING LIQUID AND GAS FLOW RATES IN A STRATIFIED MULTI-PHASE FLOW

CROSS-REFERENCE TO RELATED PATENT APPLICATIONS

This application claims the benefit of U.S. Provisional Patent Application No. 60/946,735 filed Jun. 28, 2007, which is incorporated by reference herein in its entirety.

BACKGROUND OF THE INVENTION

1. Technical Field

The present invention relates generally to the measurement of flow parameters of a multiphase fluid, and more particularly to methods and apparatus for determining the existence of stratification within the flow, and for measuring gas and liquid flow rates in a stratified flow.

2. Background Information

Many industrial fluid flow processes involve the transportation of multi-phase fluid flows through a pipe. In applications where the fluid flow travels within a pipe having a substantially horizontal centerline, the fluid flow may be subject to some degree of stratification, where gas and liquid separate into different layers. The layers are separated by a distinguishable interface and the gas flows on top of the liquid. Stratification of flow is based on many parameters such as, flow rate, gas to liquid ratio, angle of pipe, and pressure.

There is considerable value in being able to accurately determine the flow rate of the liquid and gas components in a stratified flow. In an oil and gas application, for example, determining the flow rates of the oil and gas can facilitate the processing of each component. There is particular value in the ability to determine the flow rate of the liquid and gas components in a stratified flow in a non-invasive manner. What is needed, therefore, is a method and apparatus operable to determine the component flow rates within a stratified fluid flow in a non-invasive manner.

SUMMARY OF THE INVENTION

According to the present invention, a method and apparatus for measuring a flow rate of a component of a stratified two-phase fluid flow within a substantially horizontally extending pipe is provided. The method comprises the steps of: a) determining a first fluid velocity value and a second fluid velocity value within the pipe section; b) determining a density of the fluid flow within the pipe section, and creating a measured fluid density value; and c) determining a flow rate value for at least one of a liquid component of the fluid flow and a gas component of the fluid flow within the pipe section using the respective fluid velocity value and the measured fluid density value.

According to an aspect of the present invention, an apparatus for determining a flow rate for a component of a stratified two-phase fluid flow within a substantially horizontally extending pipe section is provided. The apparatus includes a top flow meter, a bottom flow meter, a density meter, and a processor. The top flow meter is disposed at a top portion of the pipe section, and the bottom flow meter is disposed at the bottom of the pipe section. The top and bottom flow meters are each operable to measure a velocity of the fluid flow local to the respective meter and produce a fluid velocity value. The density meter is operable to measure a density of the fluid flow within the pipe section and create a measured fluid density value. The processor is operable to determine a flow rate value for at least one of a liquid component of the fluid flow and a gas component of the fluid flow within the pipe section using the fluid velocity values and measured fluid density value.

An advantage of the present invention is that it makes possible the determination of the flow rate of a liquid component and/or a gas component within a stratified fluid flow traveling within a substantially horizontally extending pipe. The ability to determine the aforesaid component flow rates is of considerable value for process management purposes.

Another advantage of the present invention is that it provides the component flow rate data in a non-invasive manner. The flow meters and density meter are externally mounted, and therefore do not restrict the flow; there is no need to cut the pipe and no associated process downtime or disruptions.

Another advantage of the present invention is that it can be used on new piping systems as well as existing systems. The fact that the flow meters and density meter are externally mounted, and do not require any alteration to the pipe makes them attractive as an original equipment item, or as a retrofit option.

BRIEF DESCRIPTION OF THE DRAWINGS

The foregoing and other features and advantages of the present invention will be more fully understood from the following detailed description of illustrative embodiments, taken in conjunction with the accompanying drawings in which like elements are numbered alike.

DETAILED DESCRIPTION OF THE INVENTION

Figure 1:
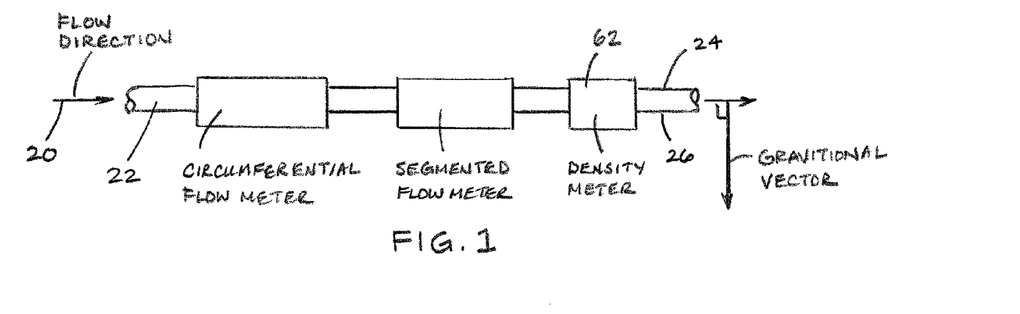
FIG. 1 is a schematic diagram of an embodiment of an apparatus according to the present invention.
Figure 1A:
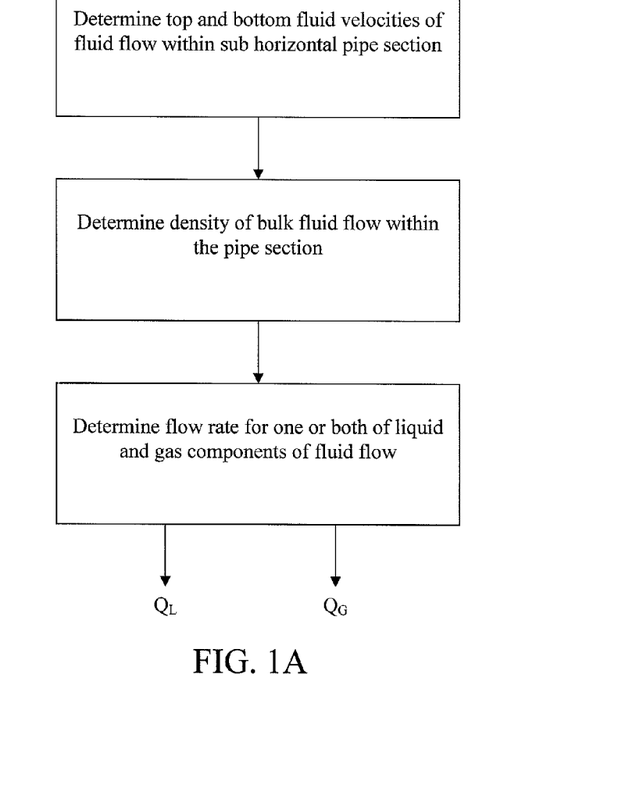
FIG. 1A is a block diagram of an embodiment of the present invention method.

The present invention provides a method and apparatus for measuring the flow rate of gas and liquid components in a stratified fluid flow 20 traveling within a substantially horizontally extending pipe 22. As will be described in greater detail below, the method comprises the steps of: a) determining a first fluid velocity value and a second fluid velocity value within the pipe 22 section; b) determining a density of the fluid flow 20 within the pipe 22 section, and creating a measured fluid density value; and c) determining a flow rate value for at least one of a liquid component 38 of the fluid flow 20 and a gas component 40 of the fluid flow 20 within the pipe 22 section. A diagrammatic view of an embodiment of the apparatus operable to measure the flow rate of gas and liquid components 38, 40 in a stratified fluid flow 20 traveling within a substantially horizontally extending pipe 22 is shown in FIG. 1. FIG. 1A is a block diagram of an embodiment of the present invention.

The term "horizontal" may be defined as being perpendicular to a gravitational vector, which vector may be referred to as extending vertically (e.g., see FIG. 1). The term "pipe" is used herein to describe a duct through which a fluid may flow, and is not limited to any particular cross-sectional geometry; e.g., circular, rectangular, etc. The pipe 22 is described herein as having a "top" and a "bottom". The terms "top" and "bottom" as used herein refer to the top portion 24 and the bottom portion 26 of the pipe 22, respectively, as they gravitationally relate to one another. A gravitational force vector points from the "top" 24 of the pipe 22 toward the "bottom" 26 of the pipe 22.

Figure 2:
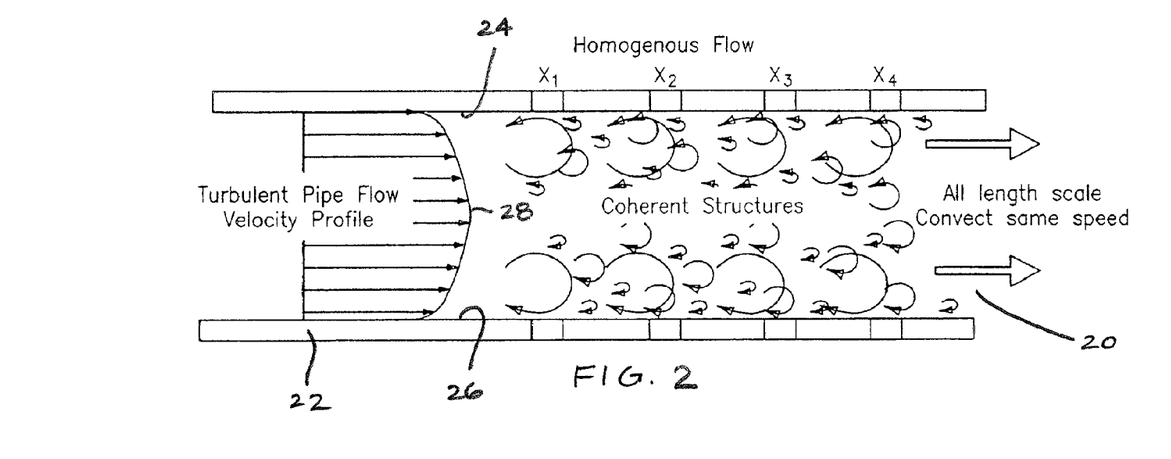
FIG. 2 is schematic diagram of homogenous fluid flow with a pipe section.
Figure 3:
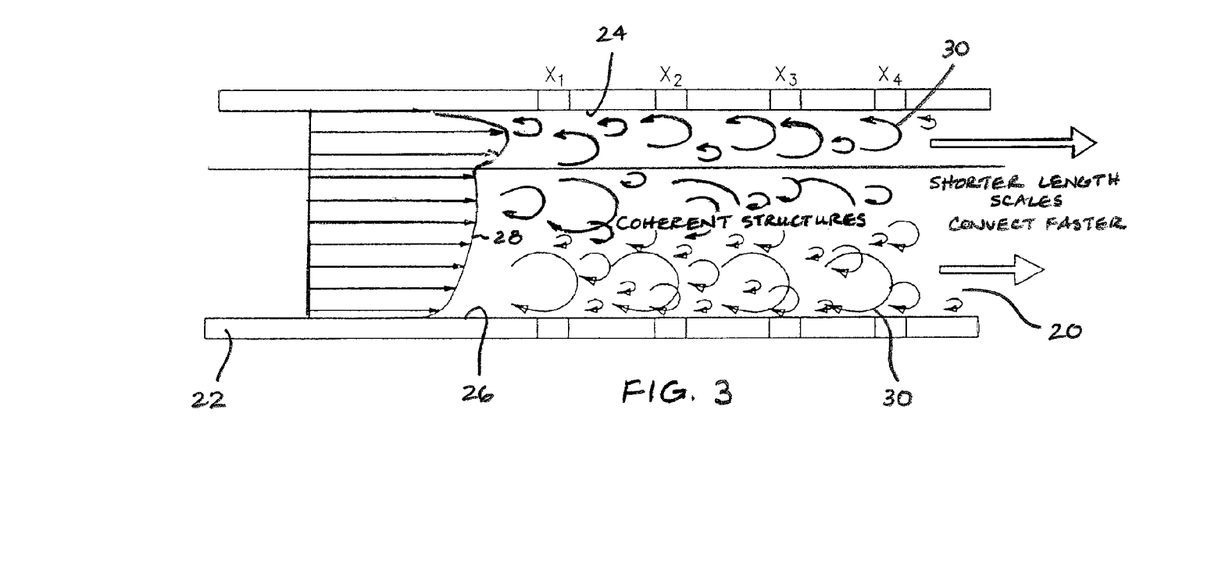
FIG. 3 is schematic diagram of stratified fluid flow with a pipe section.
Figure 4:
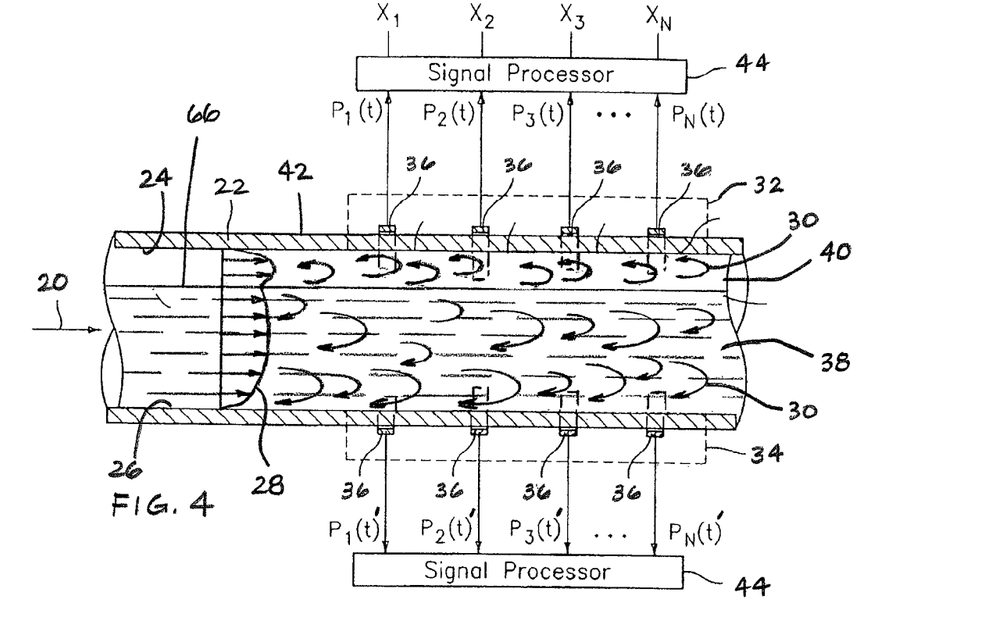
FIG. 4 is a schematic diagram in longitudinal cross-section of an apparatus for determining flow velocities within a pipe section.

Referring to FIG. 2, a side view of a pipe 22 containing a substantially homogenous fluid flow 20 is shown. The flow 20 is depicted as a non-stratified, Newtonian flow operating in the turbulent regime at Reynolds numbers above about 100,000. The velocity profile 28 of the flow 20 is uniformly developed from the top 24 of the pipe 22 to the bottom 26 of the pipe 22. The coherent structures 30 within the flow 20 convect evenly (i.e., at the same speed) across the diameter of the pipe 22. FIGS. 3 and 4, in contrast, show a side view of a pipe 22 containing a stratified fluid flow 20. In contrast to the homogenous fluid flow 20 of FIG. 2, the coherent structures 30 within the stratified fluid flow 20 do not convect evenly across the diameter of the pipe 22. As such, the coherent structures 30 near the top 24 of the pipe 22 convect faster than the coherent structures 30 near the bottom 26 of the pipe 22. Under the present invention, the level of stratification of the flow 20 is determined by comparing locally measured velocities at the top and bottom of the pipe 22. U.S. Pat. No. 6,609,069 issued to Gysling, entitled "Method and Apparatus for Determining the Flow Velocity Within a Pipe", which is incorporated herein by reference in its entirety, describes that unsteady pressures along a pipe caused by coherent structures 30 (e.g., turbulent eddies and vortical disturbances) that convect with a fluid flowing within the pipe 22 contain useful information regarding parameters of the fluid. U.S. Patent Publication No. US 2007/0005272 A1, which is also incorporated herein by reference in its entirety, describes the same and also describes sensors that can be used to detect local velocities within a fluid flow 20.

Figure 5:
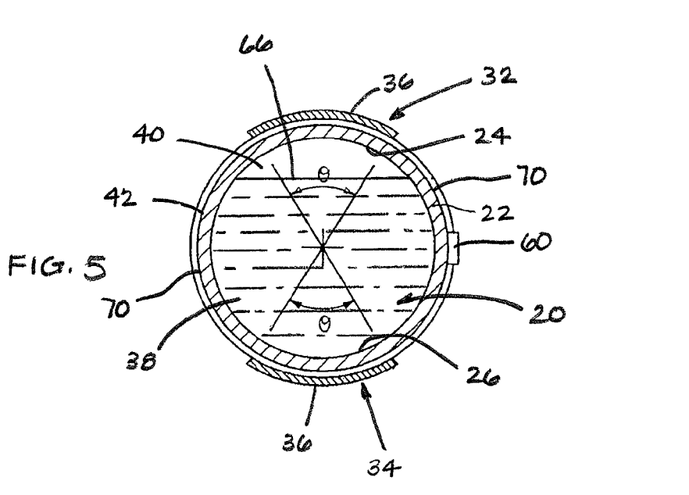
FIG. 5 is radial cross-section of an apparatus such as that shown in FIG. 4.

Flow Velocity:

Under the present invention, two or more non-invasive fluid flow meters are used in the determination of the first and second fluid velocity values within a section of pipe 22 that extends substantially horizontally; e.g., an "upper" flow meter 32 may be disposed at the top 24 of the pipe 22 for sensing fluid flow 20 at the top 24 of the pipe 22 and a "lower" flow meter 34 may be disposed at the bottom 26 of the pipe 22 for sensing fluid flow 20 at the bottom 26 of the pipe 22. FIG. 4 depicts a longitudinal cross-section of a pipe 22 with an array of sensors 36 forming an upper flow meter 32 and an array of sensors 32 forming a lower flow meter 34. FIG. 5 depicts a transverse (radial) cross-section of an upper and lower flow meter 32, 34 arrangement like that shown in FIG. 4. The flow 20 shown in FIGS. 4 and 5 within the pipe 22 is depicted as stratified, having a liquid component 38 disposed below a gas component 40; i.e., the liquid component 38 fills the bottom 26 of the pipe 22, and the gas component 40 fills a portion of the top 24 of the pipe 22.

The upper flow meter 32 includes a first spatial array of at least "N" number of sensors 36 disposed at different axial locations $x_1 \ldots x_N$ along the top of the pipe 22 (where "N" is equal to or greater than two). Each sensor 36 provides a pressure signal P(t) indicative of unsteady pressure created by coherent structures 30 convecting with a portion of the flow 20 near the top of the pipe 22. The lower flow meter 34 includes a second spatial array of "N" number of sensors 36 disposed at the different axial locations $x_1 \ldots x_N$ along the bottom 26 of the pipe 22. Each of the sensors 36 in the second spatial array provides a pressure signal P(t)' indicative of unsteady pressure created by coherent structures 30 convecting with a portion of the flow 20 near the bottom 26 of the pipe 22.

In a circular pipe 22 application, the sensor array of each flow meter 32, 34 may be described as extending over an arcuate outer surface 42 of the pipe 22 defined by the angle θ, which is centered on a vertical line; e.g., each array may extend about one-quarter of the circumference of the pipe 22. Because the sensors 36 do not extend across the lateral side portions of the pipe 22, and because the sensors 36 tend to sense local disturbances within the flow 20, the sensors 36 sense coherent structures 30 convecting with a portion of the flow 20 near the top 24 or bottom 26 of the pipe 22. Accordingly, as the size of the sensor arrays are decreased (i.e., as the angle θ is decreased), the unsteady pressures sensed by the sensors 36 more accurately indicate the nominal flow velocity of the portion of the flow 20 near the top 24 or bottom 26 of the pipe 22. However, the degree of accuracy provided by decreasing the size of the sensors 36 is offset by the decrease in signal strength provided by the sensors 36. Therefore, the size of the sensor arrays (i.e., the angle θ used) is dependent at least on the degree of accuracy desired and the strength of the signals $P_1(t), P_2(t), P_3(t) \ldots P_N(t)$ required by the signal processor 44.

The sensors 36 from each array provide analog pressure time-varying signals $P_1(t), P_2(t), P_3(t) \ldots P_N(t)$ to one or more signal processors 44 to determine flow velocity of each array. The signal processor 44 applies the pressure signals from the sensors 36 in the array to flow logic executed by the signal processor 44 to determine the velocity of the flow near the top 24 of the pipe 22. The signal processor 44 applies the pressure signals from the sensors 36 in the array to flow logic executed by the signal processor 44 to determine the velocity of the flow near the bottom 26 of the pipe 22. The flow logic applies a sonar array-processing algorithm as described below to determine the velocities.

The upper and lower flow meters 32, 34 are described above as each having an array of "N" number of sensors 36, each providing a pressure signal P(t) indicative of unsteady pressure within the pipe 22 at a corresponding axial location "x" of the pipe 22. Generally, the accuracy of the measurement improves as the number of sensors 36 in the array increases. The degree of accuracy provided by the greater number of sensors 36 is offset by the increase in complexity and time for computing the desired output parameter of the flow. Therefore, the number of sensors 36 used is dependent at least on the degree of accuracy desired and the desire update rate of the output parameter provided by the apparatus.

The signals $P_1(t) \ldots P_N(t)$ provided by the sensors 36 in the array are processed by the signal processor 44, which may be part of a larger processing unit. For example, the signal processor 44 may be a microprocessor and the processing unit may be a personal computer or other general purpose computer. It is contemplated that the signal processor 44 may be any one or more analog or digital signal processing devices for executing programmed instructions, such as one or more microprocessors or application specific integrated circuits (ASICS), and may include memory for storing programmed instructions, set points, parameters, and for buffering or otherwise storing data.

The signal processor 44 may output the velocity signals (and other parameters) to a display or another input/output (I/O) device, wherein the I/O device may also accept user input parameters. The I/O device, display, and signal processor unit may be mounted in a common housing, which may be attached to the array by a flexible cable, wireless connection, or the like. The flexible cable may also be used to provide operating power from the processing unit to the array if necessary. To determine the local velocities of the flow (and other parameters), the signal processor 44 applies the data from the sensors to 36 flow logic 46 executed by the signal processor 44.

Figure 6:
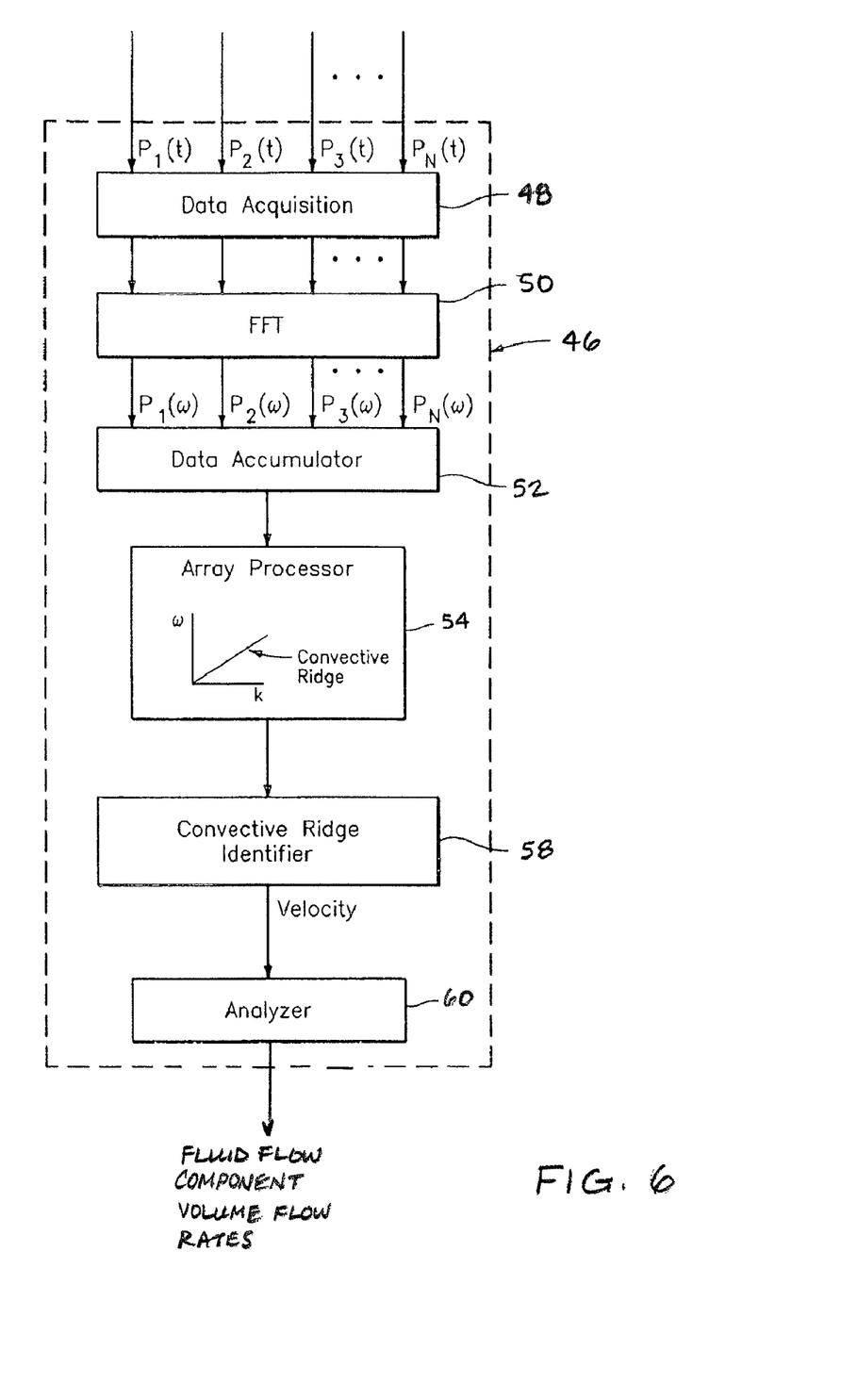
FIG. 6 is a block diagram of a flow logic used in the apparatus and method of the present invention.

An example of the flow logic 46 is shown in FIG. 6. Some or all of the functions within the flow logic 46 may be implemented in software (using a microprocessor or computer) and/or firmware, or may be implemented using analog and/or digital hardware, having sufficient memory, interfaces, and capacity to perform the functions described herein. The flow logic 46 includes a data acquisition unit 48 (e.g., A/D converter) that converts the analog signals $P_1(t) \ldots P_N(t)$ to respective digital signals and provides the digital signals $P_1(t) \ldots P_N(t)$ to FFT logic 50. The FFT logic 50 calculates the Fourier transform of the digitized time-based input signals $P_1(t) \ldots P_N(t)$ and provides complex frequency domain (or frequency based) signals $P_1(\omega), P_2(\omega), P_3(\omega), \ldots P_N(\omega)$ indicative of the frequency content of the input signals. Instead of FFTs, any other technique for obtaining the frequency domain characteristics of the signals $P_1(t)$-$P_N(t)$, may be used. For example, the cross-spectral density and the power spectral density may be used to form frequency domain transfer functions (or frequency response or ratios) discussed hereinafter.

One technique of determining the convection velocity of the coherent structures 30 (e.g., turbulent eddies) within the flow 20 is by characterizing a convective ridge of the resulting unsteady pressures using an array of sensors or other beam forming techniques, similar to that described in U.S. Pat. No. 6,609,069, which is incorporated herein by reference above. A data accumulator 52 accumulates the frequency signals $P_1(\omega)$-$P_N(\omega)$ over a sampling interval, and provides the data to an array processor 54, which performs a spatial-temporal (two-dimensional) transform of the sensor data, from the x-t domain to the k-ω domain, and then calculates the power in the k-ω plane, as represented by a k-ω plot. The array processor uses 54 standard so-called beam forming, array processing, or adaptive array-processing algorithms, i.e. algorithms for processing the sensor signals using various delays and weighting to create suitable phase relationships between the signals provided by the different sensors 36, thereby creating phased antenna array functionality. In other words, the beam forming or array processing algorithms transform the time domain signals from the sensor array into their spatial and temporal frequency components, i.e. into a set of wave numbers given by k=2π/λ where λ is the wavelength of a spectral component, and corresponding angular frequencies given by ω=2πν.

It should be appreciated that the prior art teaches many algorithms of use in spatially and temporally decomposing a signal from a phased array of sensors 36, and the present invention is not restricted to any particular algorithm. One particular adaptive array processing algorithm is the Capon method/algorithm. While the Capon method is described as one method, the present invention contemplates the use of other adaptive array processing algorithms, such as MUSIC algorithm.

Convective characteristics or parameters have a dispersion relationship that can be approximated by the straight-line equation k=ω/u, where u is the convection velocity (flow velocity). A plot of k-ω pairs obtained from a spectral analysis of sensor samples 36 associated with convective parameters are portrayed so that the energy of the disturbance spectrally corresponding to pairings appears as a substantially straight ridge; a ridge that in turbulent boundary layer theory is called a convective ridge.

Figure 7:
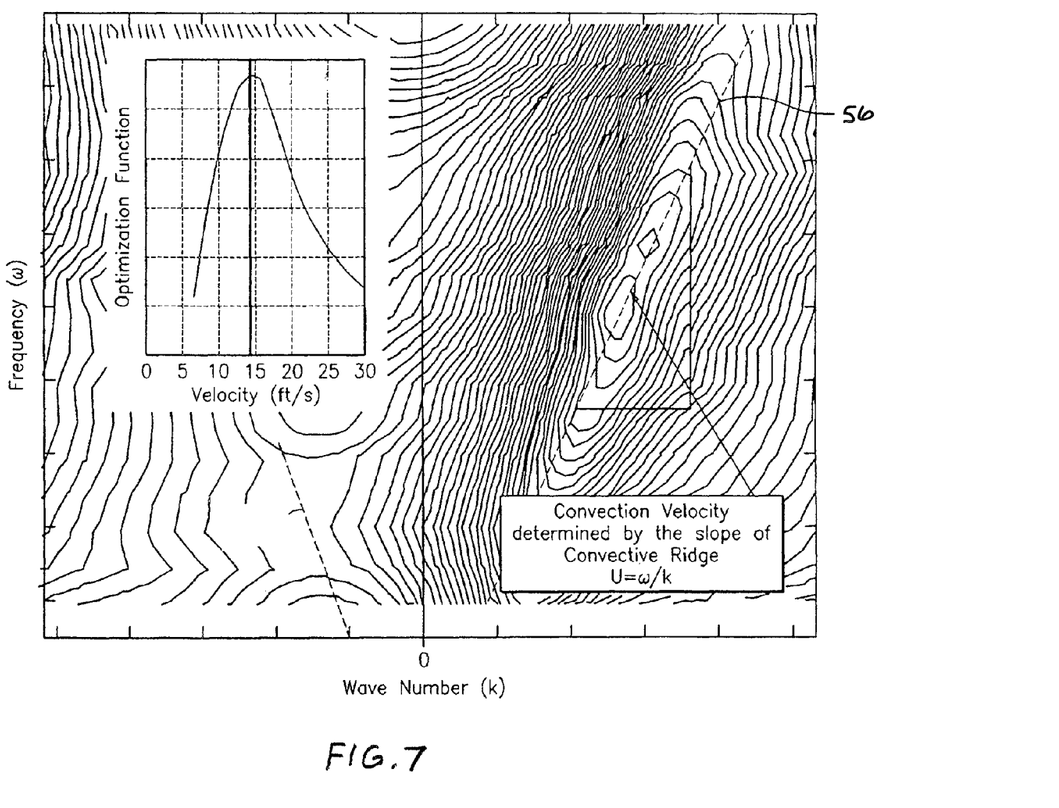
FIG. 7 is a k-ω plot of data processed from an apparatus representative of the present invention, illustrating the slope of the convective ridge and a plot of an optimization function of the convective ridge.

To calculate the power in the k-ω plane, as represented by a k-ω plot (see FIG. 7) of either of the signals, the array processor 54 determines: 1) the wavelength and the (spatial) wavenumber k; and 2) the (temporal) frequency and the angular frequency ω of various of the spectral components of the stochastic parameter. There are numerous algorithms available in the public domain to perform the spatial/temporal decomposition of arrays of sensors 36. The present embodiment may use temporal and spatial filtering to precondition the signals to effectively filter out the common mode characteristics, $P_{common}$ mode and other long wavelength (compared to the sensor spacing) characteristics in the pipe 22 by differencing adjacent sensors 36 and retaining a substantial portion of the stochastic parameter associated with the flow field and any other short wavelength (compared to the sensor 36 spacing) low frequency stochastic parameters. In the case of suitable coherent structures 30 being present, the power in the k-ω plane shown in the k-ω plot of FIG. 7 shows a convective ridge 56. The convective ridge 56 represents the concentration of a stochastic parameter that convects with the flow 20 and is a mathematical manifestation of the relationship between the spatial variations and temporal variations described above. Such a plot will indicate a tendency for k-ω pairs to appear more or less along a line with some slope, the slope indicating the flow velocity.

Once the power in the k-ω plane is determined, a convective ridge identifier 58 uses one or another feature extraction method to determine the location and orientation (slope) of any convective ridge 56 present in the k-ω plane. In one embodiment, a so-called slant stacking method is used, a method in which the accumulated frequency of k-ω pairs in the k-ω plot along different rays emanating from the origin are compared, each different ray being associated with a different trial convection velocity (in that the slope of a ray is assumed to be the flow velocity or correlated to the flow velocity in a known way). The convective ridge identifier 58 may accumulate energy for each array by summing the energy of k-ω pairs along the ray. Alternatively, other methods of accumulating energy along the ray (e.g., averaging) may be used. In any case, accumulated energy is determined for a range of trial velocities between a predetermined minimum velocity and a predetermined maximum velocity. The convective ridge 56 has an orientation that is the slope of the ray having the largest accumulated energy. The convective ridge identifier 58 provides information about the different trial convection velocities, information referred to generally as convective ridge information.

The analyzer 60 examines the convective ridge information including the convective ridge orientation (slope). Assuming the straight-line dispersion relation given by k=ω/u, the analyzer 60 determines the flow velocity. As previously noted, for turbulent, Newtonian fluids, there is typically not a significant amount of dispersion over a wide range of wavelength to diameter ratios. As a result, the convective ridge 56 in the k-ω plot is substantially straight over a wide frequency range and, accordingly, there is a wide frequency range for which the straight-line dispersion relation given by k=ω/u provides accurate flow velocity measurements.

A variety of different sensors 36 can be used with the present invention. An example of an acceptable type of sensor 36 is a strip of piezoelectric material such as polymer, polarized fluoropolymer (PVDF), which measures the strain induced within the pipe 22 due to the coherent structures 30 convecting with the flow. A specific example of an acceptable sensor 36 for most applications is a Model 106B manufactured by PCB Piezotronics, of Depew, N.Y., USA, which sensor 36 is a high sensitivity, acceleration compensated integrated circuit piezoelectric quartz pressure sensor suitable for measuring low pressure acoustic phenomena in hydraulic and pneumatic systems. In addition to PVDF films, sensors 36 can also be formed from co-polymer films or flexible PZT sensors, similar to that described in "Piezo Film Sensors technical Manual" provided by Measurement Specialties, Inc. of Fairfield, N.J., which manual is incorporated herein by reference.

The strips of piezoelectric film material forming the sensors 36 along each axial location $x_1 \ldots x_N$ of the pipe 22 may be adhered to the surface of a steel strap 60 (e.g., a hose clamp) that extends around and clamps onto the outer surface 42 of the pipe 22. Strain within the pipe 22 is transduced to an output voltage or current by the attached piezoelectric sensors. As discussed hereinafter, other types of sensors 36 and other methods of attaching the sensors 36 to the pipe 22 may be used.

In still other embodiments, the sensors 36 may include electrical strain gages, optical fibers and/or gratings, ported sensors, ultrasonic sensors, among others as described herein, and may be attached to the pipe 22 by adhesive, glue, epoxy, tape or other suitable attachment means to ensure suitable contact between the sensor and the pipe 22. The sensors 36 may alternatively be removable or permanently attached via known mechanical techniques such as mechanical fastener, spring loaded, clamped, clam shell arrangement, strapping or other equivalents. Alternatively, strain gages, including optical fibers and/or gratings, may be embedded in a composite pipe 22. If desired, for certain applications, gratings may be detached from (or strain or acoustically isolated from) the pipe 22 if desired. It is also contemplated that any other strain sensing technique may be used to measure the variations in strain in the pipe 22, such as highly sensitive piezoelectric, electronic or electric, strain gages attached to or embedded in the pipe 22.

Flow Density:

Under the present invention, the density of the bulk fluid flow may be measured using any known type of density meter 62, such as a coriolis meter or a nuclear densitometer. In a preferred embodiment, however, a nuclear densitometer is used. Nuclear density technology allows in-situ and real time density measurement without product sampling. Nuclear density gauges consist of a sealed source in a source-holder and a scintillation detector. The source-holder is mounted on the side of a pipe 22 or chute with the detector on the opposite side. A focused beam of radiation is transmitted from the source through the pipe 22 and process material to the detector. The amount of radiation that reaches the detector is a function of the density of the fluid flow 20 within the pipe 22; i.e., the greater the density of the material, the lower the radiation field at the detector; the lower the density of the material, the higher the radiation field at the detector.

Performing the Method:

In the determination of a flow rate for at least one of a liquid component 38 and a gas component 40 of a stratified fluid flow 20 traveling within a substantially horizontally extending pipe 22, the fluid flow velocities may be determined using a flow meter 32 disposed at the top of the pipe 22 and a flow meter 34 disposed at the bottom of the pipe 22 as is described hereinbefore. The array of sensors 36 for each flow meter 32, 34 extends for a portion of the circumference (or periphery in a non-circular application) of the pipe 22. FIGS. 4 and 5 show sensor arrays that cover an equal amount of pipe 22 circumference, and are axially aligned with one another. This is a preferred embodiment, but is not required. Each flow meter 32, 34 is operated to non-invasively determine the flow velocity within the fluid flow 20 local to the respective flow meter 32, 34; e.g., top 24 and bottom 26 of the pipe 22. The determined fluid flow velocity values are subsequently compared to each other. If the top and bottom fluid flow velocity values are substantially equal, there is a high probability that the fluid flow 20 within the pipe 22 is homogenous, non-stratified flow 20. Fluid flow velocity values that are not substantially equal, on the other hand, are indicative of fluid flow 20 stratified by phase to some degree.

Figure 8:
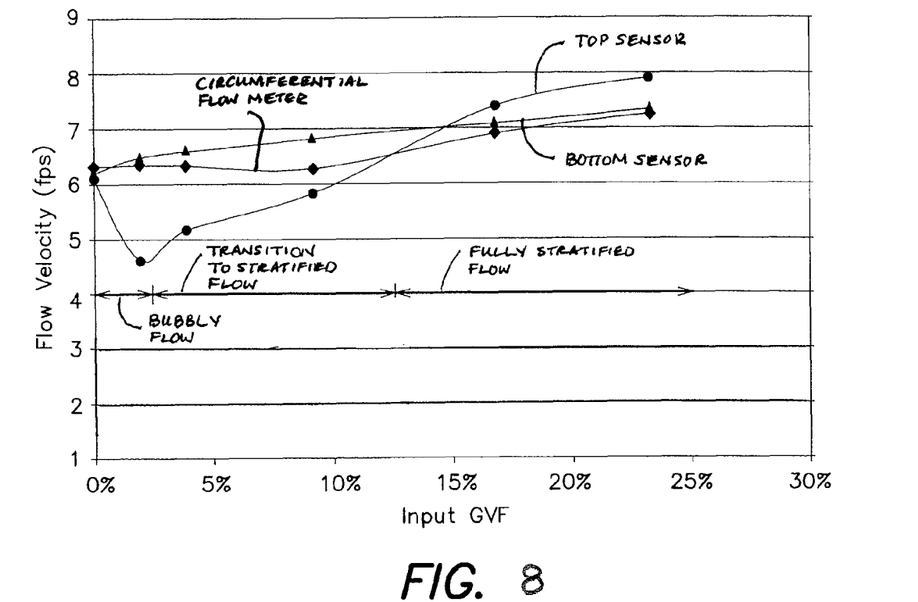
FIG. 8 is a graph of flow velocity versus gas volume fraction for a fluid flow containing water and air, including trace graphs for the sensors of top and bottom flow meters, a circumferential flow meter, and bands indicating the transition from homogenous flow to fully stratified flow.
Figure 9:
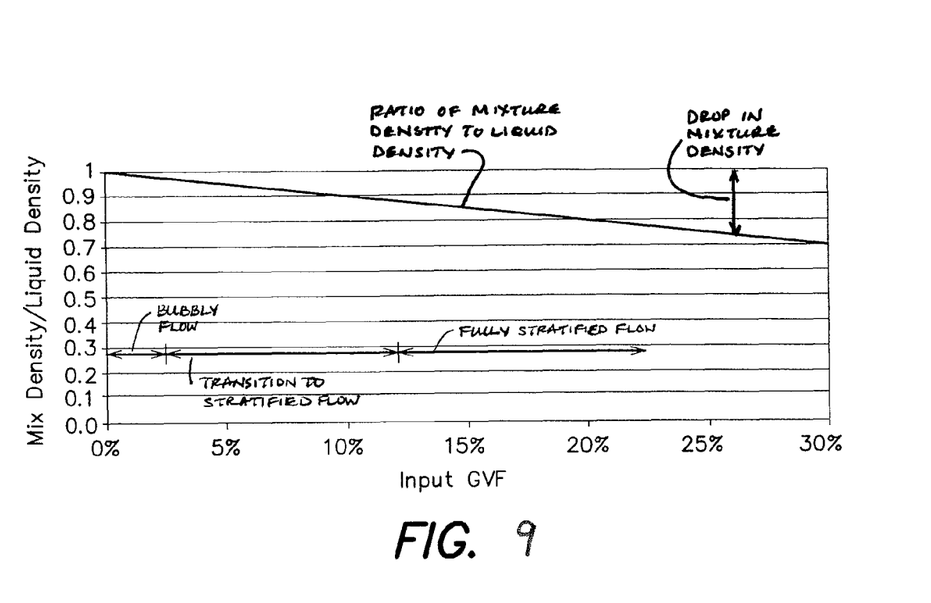
FIG. 9 is a graph of mixture density over liquid density versus gas volume fraction for a fluid flow containing water and air.

FIG. 8 is a graph depicting gas volume fraction of a fluid flow 20 versus flow velocity in feet per second, based on laboratory data for a fluid flow 20 comprised of water and air. The vertical axis of the graph shows equal flow velocity values provided by the top and bottom flow meters 32, 34 for homogenous flow. Moving to the right, the graph illustrates the transition from bubbly flow region (where the flow 20 is no longer homogenous, and contains gas bubbles that have not coalesced), to a partially stratified flow region (where gas bubbles have moved to the top of the pipe 22 but still have not formed a continuous channel of gas), to a fully stratified fluid flow 20; i.e., stratified by fluid phase (where there is a continuous channel of gas 40 above a continuous body of liquid 38). The range of the gas volume fraction where the flow 20 transitions to a fully stratified flow 20 will vary due to factors such as flow velocity, pressure, and type of liquid. The curves traced within the graph of FIG. 8 illustrate flow velocity versus gas volume fraction for the top sensor 32, the bottom sensor 34, and a circumferential flow meter 64 (referred to as a "whole band sensor"; see FIG. 1). The "whole band" flow meter 64 is a flow meter having sensors that sense around the entire circumference of the pipe 22. Flow data from the whole band flow meter 64 can be used to evaluate the data from the top flow meter and the bottom flow meter. The data curves from the top and bottom flow meters 32, 34 indicate that the gas component 40 of the fluid flow 20 travels at a faster velocity than does the liquid component 38 after transition into fully stratified flow. FIG. 9 is a graph depicting fluid flow 20 mixture density over the liquid density versus the gas volume fraction of the fluid flow, based on laboratory data for a fluid flow comprised of water and air. Here again, the graph illustrates the transition from bubbly flow region, to a partially stratified flow region, to a fully stratified fluid flow. The presence of gas in the fluid flow 20 reduces the effective mixture density. The determination of the degree to which the fluid flow 20 is stratified using the top and bottom fluid flow velocity values can be performed using a database as is graphically shown in FIGS. 8 and 9. The determination is not limited to that made from a database, however, and may be performed using an algorithm, predetermined values, etc.

The present method further includes the step of determining the density of the fluid flow 20. The density of the liquid component 38 is either a known value or can be determined by any known technique. The density meter 62 is used to determine the density of the fluid flow 20 within the pipe 22. The determined density value is compared to a reference value to determine if the fluid flow 20 completely comprises liquid, or whether it includes gas. A fluid flow 20 having a density value less than the density value of the liquid component 38 will include some amount of gas. The reference value may be the density value for the liquid component 38 or an arbitrarily chosen value; e.g., a normalized density value, etc.

In some embodiments, the determination of the degree to which the fluid flow 20 is stratified may use both the density value determined (e.g., in the form of a data point representing the determined density value versus the density value of the liquid component 38, or GVF, etc.) and the top and bottom fluid flow velocity values. The determination can be made using a database as is graphically shown in FIGS. 8 and 9, or using an algorithm, predetermined values, etc.

The step of determining a flow rate value for at least one the liquid component 38 and the gas component 40 of the fluid flow 20 can be performed using the density of the liquid component 38 ($\rho_L$), the density of the gas component 40 ($\rho_G$), the determined density of the fluid flow ($\rho_{meas}$) the velocity of the gas component 40 ($v_G$) or the velocity of the liquid component 38 ($v_L$)—depending on which flow rate is desired—, and the cross-sectional area of the pipe 22 ($A_C$).

Figure 10:
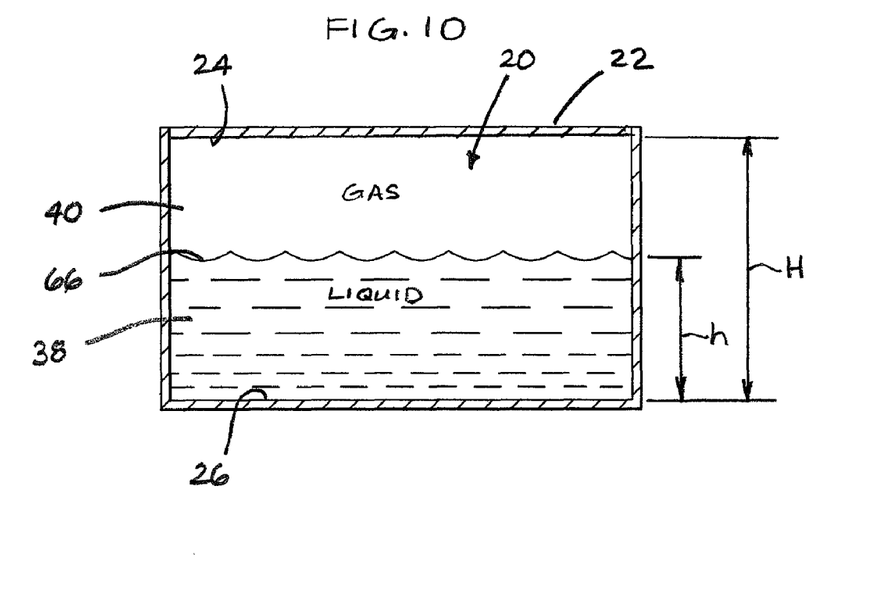
FIG. 10 is a diagrammatic view of stratified flow within a rectangular pipe/duct.

The flow rate values can be determined mathematically if the geometry of the pipe 22 is known. For example, if one assumes that the interface 66 between the liquid component 38 and the gas component 40 of the fluid flow 20 is equal to "h" in a rectangular duct/pipe 22 having an interior height equal to "H" (e.g., see FIG. 10), then the determined density of the fluid flow 20 may be expressed as follows:

$$\rho_{meas} = \frac{h * \rho_L + (H - h) * \rho_G}{H} \qquad \text{Eqn. 1}$$

$$\frac{h}{H} = \frac{\rho_{meas} - \rho_G}{\rho_L - \rho_G}. \qquad \text{Eqn. 2}$$

The flow rate ($Q_{liquid}$) of the liquid may be expressed as follows:

$$Q_{liquid} = v_L * A_C * \frac{h}{H}. \qquad \text{Eqn. 3}$$

$$Q_{liquid} = v_L * A_C * \frac{(\rho_{meas} - \rho_G)}{(\rho_L - \rho_G)} \qquad \text{Eqn. 4}$$

for a rectangular duct. In similar fashion, the flow rate of the gas component 40 ($Q_{gas}$) can be expressed as follows:

$$Q_{gas} = v_G * A_C * \frac{(\rho_L - \rho_{meas})}{(\rho_L - \rho_G)} \qquad \text{Eqn. 5}$$

for a rectangular duct.

Figure 11:
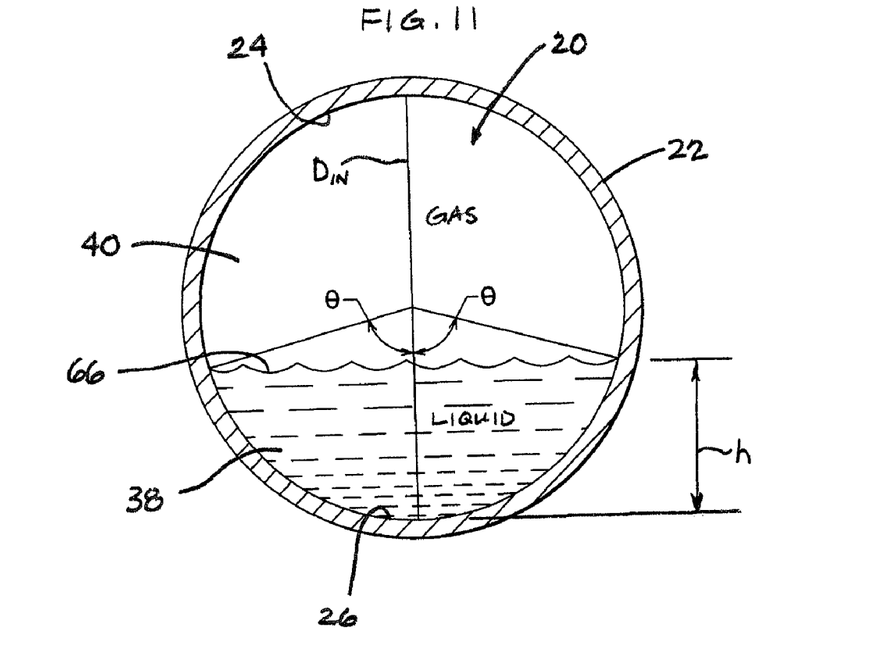
FIG. 11 is a diagrammatic view of stratified flow within a circular pipe.

If the fluid flow 20 is traveling within a circular cross-section pipe 22 having an inner diameter $D_{IN}$ and a cross-sectional area $A_C$, the flow rate of the liquid component 38 can be determined for a pipe 22, where the cross-sectional area of the liquid is filled is represented by $A_L$ and the inner diameter of the pipe 22 is $D_{IN}$ (see FIG. 11):

$$\cos\theta = \left(1 - \frac{2h}{D_{IN}}\right) \qquad \text{Eqn. 6}$$

$$A_L = \left[\theta\left(\frac{D_{IN}}{2}\right)^2 - \left(\frac{D_{IN}}{2} - h\right)\sqrt{h(D_{IN} - h)}\right] \qquad \text{Eqn. 7}$$

$$\rho_{meas} = \frac{A_L \rho_L + A_C \rho_G}{A_C} \qquad \text{Eqn. 8}$$

$$A_L = \frac{A_C(\rho_{meas} - \rho_G)}{\rho_L} \qquad \text{Eqn. 9}$$

$$A_C = \pi\left(\frac{D_{IN}}{2}\right)^2 \qquad \text{Eqn. 10}$$

$$Q_{liquid} = v_L * A_L \qquad \text{Eqn. 11}$$

$$Q_{gas} = v_G * (A_C - A_L) \qquad \text{Eqn. 12}$$

The mathematical flow rate determinations provided above are examples relative to specific pipe 22 geometries. The present invention is not limited to these particular mathematical expressions, or pipe geometries.

Figure 12:
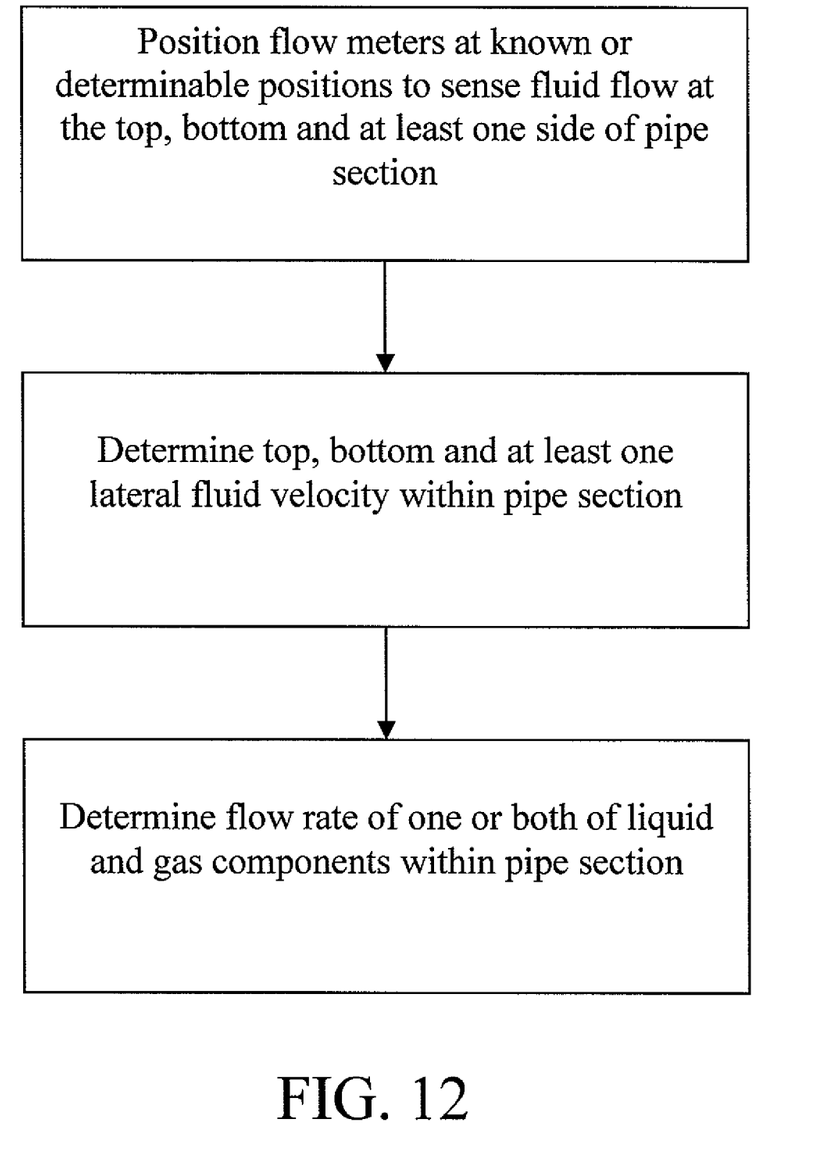
FIG. 12 is a block diagram of an embodiment of the present invention method.
Figure 13:
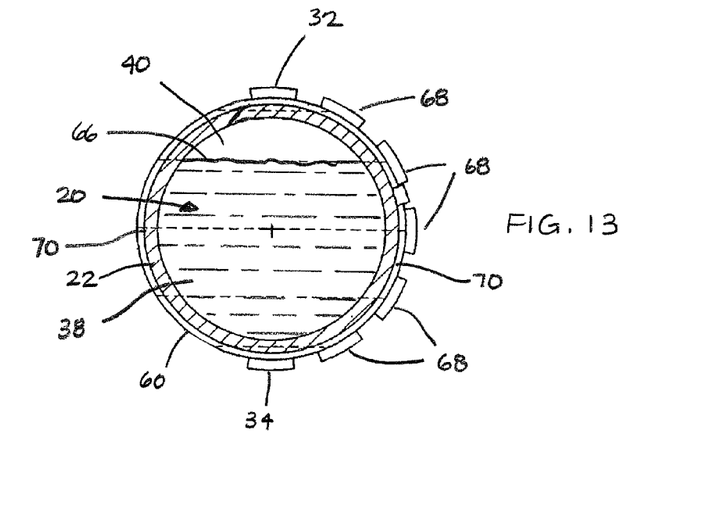
FIG. 13 is a diagrammatic radial cross-section view of a pipe including a top flow meter, a bottom flow meter, and a plurality of lateral flow meters.
Figure 14:
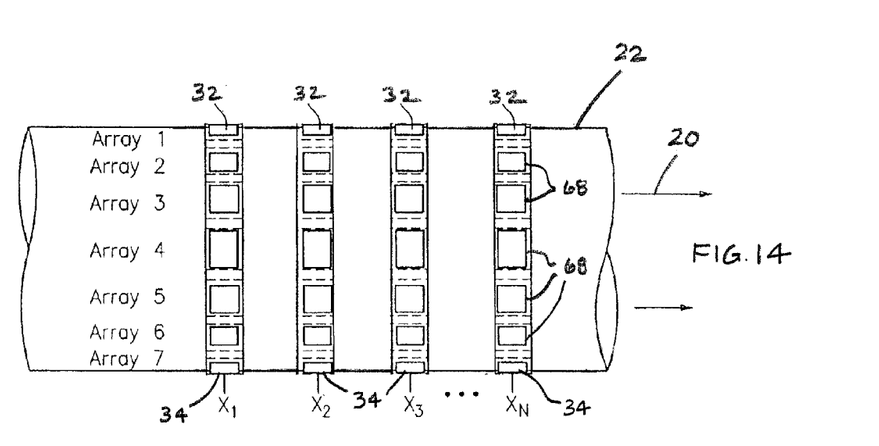
FIG. 14 is a diagrammatic side view of the pipe and flow meter arrangement shown in FIG. 13.

In an alternative embodiment shown in FIGS. 12-14, the present invention may utilize one or more flow meters 68 disposed along one or both lateral sides 70 of the pipe 22 as well as the top and bottom flow meters 32, 34. The lateral, or "side" flow meters 68, may be of the type described above; e.g., each having an array of sensors 36 aligned axially along the pipe 22 and positioned between the top and bottom flow meters 32, 34. The sensors 36 in each additional array provide analog pressure time-varying signals $P_1(t)$, $P_2(t)$, $P_3(t)$ ... $P_N(t)$ to one or more signal processors 44, which determines flow velocity of the fluid proximate the respective flow meter. The local flow velocities, in turn, can be used to determine the position of the interface 66 between the gas component 40 and the liquid component 38 of the fluid flow 20. The precision with which the interface 66 is determined can be increased by using a greater number of lateral flow meters 68, each sensing over a smaller area. Once the position of the liquid/gas interface 66 is determined, the flow rates of the liquid and gas components 38, 40 of the fluid flow 20 can be determined using the respective flow velocity and cross-sectional area.

It should be appreciated that the present invention can be embodied in the form of computer-implemented processes and apparatuses for practicing those processes.

The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

It should be understood that any of the features, characteristics, alternatives or modifications described regarding a particular embodiment herein may also be applied, used, or incorporated with any other embodiment described herein. Although the invention has been described and illustrated with respect to exemplary embodiments thereof, the foregoing and various other additions and omissions may be made therein and thereto without departing from the spirit and scope of the present invention.

What is claimed is:

1. A method for determining a flow rate for a component of a gravitationally stratified two-phase fluid flow within a substantially horizontally extending pipe section, comprising the steps of:
    providing a first flow meter located at a gravitational top portion of the pipe section;
    providing a second flow meter located at a gravitational bottom portion of the pipe section;
    determining a gas component velocity value by sensing fluid flow traveling in the gravitational top portion of the pipe section using the first flow meter, and determining a liquid component velocity value by sensing fluid traveling in the gravitational bottom portion of the pipe section using the second flow meter, wherein the gravitational top and gravitational bottom portions of the pipe are substantially axially aligned with one another;
    determining a density of the two-phase fluid flow within the pipe section using a density meter, and creating a measured fluid density value representative of the two-phase fluid flow; and
    determining a flow rate value for at least one of the liquid component of the fluid flow and the gas component of the fluid flow within the pipe section, using the measured fluid density and the respective determined liquid component velocity and gas component velocity.

2. The method of claim 1, wherein the gravitational top portion of the pipe section is defined by a radial angle θ, which angle is equal to or less than 90 degrees.

3. The method of claim 2, wherein the gravitational bottom portion of the pipe section is defined by the radial angle θ.

4. The method of claim 1, wherein the step of determining the flow rate value includes provision of a density value of the liquid component of the fluid flow and a density value of the gas component of the fluid flow within the pipe section, and uses the measured fluid density value, the liquid component density value, and the gas component density value to determine the flow rate value of at least one of the liquid component and the gas component of the fluid flow within the pipe section.

5. The method of claim 4, wherein the step of determining the flow rate value further comprises the provision of a cross-sectional geometry of the pipe section, which cross-sectional geometry has a cross-sectional area.

6. The method of claim 1, wherein the step of determining a density of the fluid flow includes determining if the measured fluid density value is substantially equal to or less than a density value of the liquid component of the fluid flow within the pipe section.

7. The method of claim 1, wherein the first and second flow meters are each operable to sense local unsteady pressures caused by coherent structures convecting locally within the fluid flow relative to the respective flow meter.

8. The method of claim 1, wherein the first and second flow meters are axially aligned, and opposite one another on the pipe section, and each extends a distance along an outer surface of the pipe section defined by a radial angle θ, which angle is less than 90 degrees.

9. The method of claim 1, further comprising the step of determining a degree of fluid phase stratification of the fluid flow utilizing information provided in a database that includes flow velocity values and gas volume fraction values.

10. The method of claim 1, further comprising the step of determining a bulk flow velocity of the fluid flow, and using the bulk flow velocity to evaluate the gas component velocity value and the liquid component velocity value.

11. An apparatus for determining a flow rate for a component of a gravitationally stratified two-phase fluid flow within a substantially horizontally extending pipe section, the apparatus comprising:
    a top flow meter disposed at a gravitational top portion of the pipe, wherein the top flow meter is operable to measure a velocity of the fluid flow local to the top flow meter and produce a gravitational top fluid velocity value;
    a bottom flow meter disposed at a gravitational bottom portion of the pipe, wherein the bottom flow meter is operable to measure a velocity of the fluid flow local to the bottom flow meter and produce a gravitational bottom fluid velocity value;
    a density meter operable to measure a density of the two-phase fluid flow within the pipe section and create a measured fluid density value representative of the two-phase fluid flow; and
    a processor operable to determine a flow rate value for at least one of a liquid component of the fluid flow and a gas component of the fluid flow within the pipe section using one of the gravitational top fluid velocity value and the gravitational bottom fluid velocity, and the measured fluid density value.

12. The apparatus of claim 11, wherein each of the top and bottom flow meters are operable to sense local unsteady pressures caused by coherent structures convecting locally within the fluid flow relative to the respective flow meter.

13. The apparatus of claim 11, wherein the top flow meter extends for a distance along an outer surface of the pipe section defined by a radial angle θ, which angle is equal to or less than 90 degrees.

14. The apparatus of claim 13, wherein the bottom flow meter extends for a distance along the outer surface of the pipe defined by the radial angle θ.

15. The apparatus of claim 14, wherein the top and bottom flow meters are axially aligned, and opposite one another on the pipe section.

* * * * *